US012771518B2

(12) United States Patent
Kanneath Abraham

(10) Patent No.: US 12,771,518 B2
(45) Date of Patent: Oct. 20, 2026

(54) CARRIER ALLOCATION IN WIRELESS NETWORK

(71) Applicant: NOKIA TECHNOLOGIES OY, Espoo (FI)

(72) Inventor: Aby Kanneath Abraham, Kerala (IN)

(73) Assignee: Nokia Technologies Oy, Espoo (FI)

(*) Notice: Subject to any disclaimer, the term of this patent is extended or adjusted under 35 U.S.C. 154(b) by 273 days.

(21) Appl. No.: 17/793,501

(22) PCT Filed: Dec. 10, 2020

(86) PCT No.: PCT/EP2020/085395

§ 371 (c)(1),
(2) Date: Jul. 18, 2022

(87) PCT Pub. No.: WO2021/148192

PCT Pub. Date: Jul. 29, 2021

(65) Prior Publication Data

US 2023/0075568 A1 Mar. 9, 2023

(30) Foreign Application Priority Data

Jan. 21, 2020 (IN) ............................ 202041002666

(51) Int. Cl.
*H04L 5/00* (2006.01)
*H04W 8/18* (2009.01)
(Continued)

(52) U.S. Cl.
CPC ............. *H04L 5/0098* (2013.01); *H04W 8/18* (2013.01); *H04W 24/08* (2013.01); *H04W 88/06* (2013.01)

(58) Field of Classification Search
CPC ........ H04L 5/003; H04L 5/0098; H04W 8/18; H04W 8/183; H04W 24/08; H04W 68/00; H04W 88/06
See application file for complete search history.

(56) References Cited

U.S. PATENT DOCUMENTS

2015/0341897 A1* 11/2015 Zhu .................... H04W 68/005 370/329
2016/0242091 A1 8/2016 Krishnamoorthy et al.
(Continued)

FOREIGN PATENT DOCUMENTS

EP 3 764 717 A2 1/2021
WO 2018/141081 A1 8/2018

OTHER PUBLICATIONS

International Search Report and Written Opinion dated Mar. 29, 2021 corresponding to International Patent Application No. PCT/EP2020/085395.
(Continued)

*Primary Examiner* — Pao Sinkantarakorn
(74) *Attorney, Agent, or Firm* — Barta Jones, PLLC

(57) ABSTRACT

According to an example aspect of the present invention, there is provided a method comprising: receiving, from a network node serving a first subscription associated with the wireless communication device, an indication of one or more carriers for reallocation to monitor communication over a second subscription associated with the wireless communication device; identifying a first carrier from a plurality of carriers on the basis of the indication; and reallocating the first carrier to monitor communications over the second subscription.

20 Claims, 4 Drawing Sheets

(51) Int. Cl.
*H04W 24/08* (2009.01)
*H04W 88/06* (2009.01)

(56) References Cited

U.S. PATENT DOCUMENTS

| | | | | |
|---|---|---|---|---|
| 2016/0242181 | A1 | 8/2016 | Ponukumati et al. | |
| 2017/0208611 | A1* | 7/2017 | Chincholi | H04W 72/1215 |
| 2017/0223589 | A1* | 8/2017 | Lee | H04W 76/15 |
| 2017/0257807 | A1* | 9/2017 | Zacharias | H04L 5/001 |
| 2021/0014667 | A1* | 1/2021 | Lovlekar | H04W 88/06 |
| 2021/0105607 | A1* | 4/2021 | Ioffe | H04W 60/005 |
| 2021/0282103 | A1* | 9/2021 | Zhu | H04W 76/15 |

OTHER PUBLICATIONS

Huawei et al., "Key points on Dual SIM SID," 3GPP Draft; RP-192792, 3GPP TSG RAN Meeting #86, Sitges, Spain, Dec. 9-12, 2019, Dec. 2, 2019, XP051834384.

3GPP TR 23.761 V0.2.0 (Dec. 2019), Technical Report, 3rd Generation Partnership Project; Technical Specification Group Services and System Aspects; Study on system enablers for devices having multiple Universal Subscriber Identity Modules (USIM) (Release 17), Dec. 6, 2019, pp. 1-19, XP051840713.

Vivo, "Observations on RAN impacts for RAN related objectives in SID multi-SIM," 3GPP Draft, S2-1905784, SA WG2 Meeting #133, May 13-17, 2019, Reno, NV, USA, May 7, 2019, XP051735965.

Apple Inc., "Views on R17 MU-SIM," 3GPP Draft; RP-193107, 3GPP TSG-RAN Meeting #86, Sitges, Spain, Dec. 9-12, 2019, Dec. 10, 2019, XP051838818.

Nokia et al., "Scenarios and Impact analysis for Switching Notification," 3GPP Draft; R2-2009265, 3GPP TSG-RAN WG2 Meeting #112 Electronic, Elbonia, Nov. 2-13, 2020, Oct. 22, 2020, XP051941286.

Office Action dated Nov. 14, 2022, corresponding to Indian Patent Application No. 202247046533.

Communication under Rule 71(3) EPC (Notice of Intention to Grant) received for corresponding European Patent Application No. 20829540.2, dated Sep. 8, 2025, 38 pages.

Notification of Grant letter received for corresponding European Patent Application No. 20829540.2, dated Sep. 18, 2025, 1 page.

* cited by examiner

CARRIER ALLOCATION IN WIRELESS NETWORK

RELATED APPLICATION

This application was originally filed as PCT Application No. PCT/EP2020/085395 on Dec. 12, 2020.

FIELD

Various example embodiments relate to carrier allocation in wireless networks, and in particular to carrier reallocation for wireless communication devices associated with multiple subscriptions.

BACKGROUND

In a modern mobile communication systems, wireless communication devices, such as smartphones, may each include one or more subscriber identity module SIM cards containing SIMs that enable a user to connect to different mobile communication networks while using the same communication device. Some examples of mobile communication networks include Third Generation (3G), Fourth Generation (4G), Long Term Evolution (LTE), Fifth Generation (5G), Time Division Multiple Access (TDMA), Frequency Division Multiple Access (FDMA), and Code Division Multiple Access (CDMA) based networks. A wireless communication device may be capable of supporting more than one communications channel or transmit/receive chains using only shared RF resource. In carrier aggregation, two or more carriers, in the same frequency band or in different frequency bands, are combined into a data channel, facilitating increased data rates. Each aggregated carrier may be referred to as a component carrier, CC. For example, the device may have an RF resource that supports a primary component carrier and one or more secondary component carriers.

A communication device that includes one or more SIMs may be termed a multi-SIM or multi-subscription communication device. Each SIM serves to identify and authenticate a subscriber using a particular mobile communication device, and each SIM is associated with only one subscription. Each SIM may be associated with a separate radio access technology (RAT) connection, such as one or more of LTE, GSM, and 5G new radio (NR) connection. The multi-SIM device may be capable of connecting to two or even more separate mobile communications networks using the specific RAT connections associated with the different SIMs and subscriptions. The RAT connections may share common RF components, to communicate with the respective different networks for their respective subscriptions. Even when a RAT connection is not used for active communication with the network, in an idle or standby mode, a shared RF resource periodically is needed for it to perform network operations of the idle or standby mode, e.g. to receive paging messages. A RAT connection in active communication mode may occasionally be forced to interrupt operations via the shared RF resource so that the shared RF resource may be used for the idle RAT connection to perform idle-standby mode operations. Such switching of access of the shared RF resource from the active RAT connection to the idle RAT connection may be referred to as tune-away, which may require carrier selection. Adverse impact of such tune-away for the active communication should be minimized.

SUMMARY OF THE INVENTION

According to some aspects, there is provided the subject-matter of the independent claims. Some embodiments for some or all of the aspects are defined in the dependent claims.

According to a first aspect, there is provided a first method, comprising: receiving, from a network node serving a first subscription associated with the wireless communication device, an indication of one or more carriers for reallocation to monitor communication over a second subscription associated with the wireless communication device; identifying a first carrier from a plurality of carriers on the basis of the indication; and reallocating the first carrier to monitor communications over the second subscription.

According to a second aspect, there is provided a second method, comprising: receiving, by the network node configured to serve a first subscription associated with a wireless communication device, information of a set of carriers available for communications over a second subscription associated with the wireless communication device; defining one or more carriers from the set of carriers for reallocation to monitor communications over the second subscription; and transmitting an indication of the one or more carriers to the wireless communication device.

According to a third aspect, there is provided an apparatus, comprising at least one processor, at least one memory including computer program code, the at least one memory and the computer program code being configured to, with the at least one processor, cause the apparatus at least to perform the method of the first aspect or an embodiment thereof, such as one or more of the embodiments described in respective dependent apparatus claims. An apparatus may comprise means configured for performing the method of the first aspect or an embodiment thereof. The apparatus may be the wireless communication device or an element thereof, such as a user equipment.

According to a fourth aspect, there is provided an apparatus, comprising at least one processor, at least one memory including computer program code, the at least one memory and the computer program code being configured to, with the at least one processor, cause the apparatus at least to perform the method of the second aspect or an embodiment thereof, such as one or more of the embodiments described in respective dependent apparatus claims. An apparatus may comprise means configured for performing the method of the second aspect or an embodiment thereof. The apparatus may be network node or an element thereof, such as a base station or an evolved or next generation nodeB.

According to a fifth aspect, there is provided a computer program product, a computer readable medium, or a non-transitory computer readable medium comprising program instructions for causing an apparatus to perform the method according to any one of the above aspects or an embodiment thereof.

EMBODIMENTS

Figure 1:
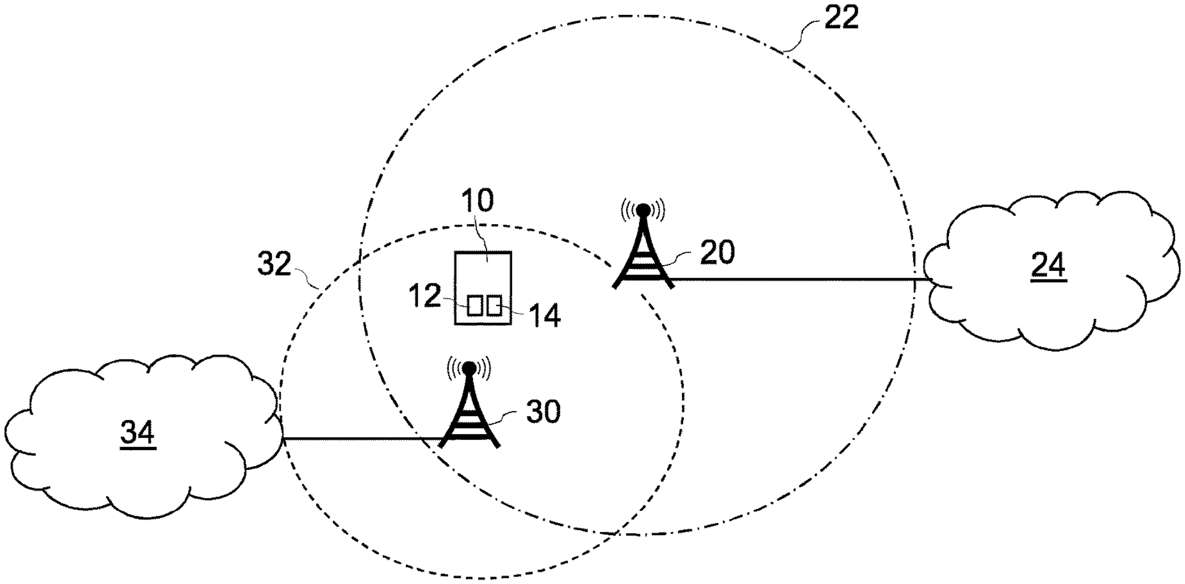
FIG. 1 illustrates a network scenario in accordance with at least some embodiments.

FIG. 1 illustrates a simplified example system in accordance with at least some embodiments. A wireless communication device, in the present examples referred to as a user equipment (UE) 10 communicates wirelessly with a radio or wireless access network node, hereafter also referred to as AN, 20, such as a nodeB (which may also refer to an evolved NodeB (eNB) or a Next Generation (NG) NodeB (gNB)), a base station, an access point, or other suitable wireless/radio access network device or system.

The UE 10 may be attached to a cell 22, 32 of the AN, 20, 30 for wireless communications. The air interface between UE and AN may be configured in accordance with at least one RAT, which both the UE 10 and AN 20, 30 are configured to support.

Some examples of cellular RATs include CDMA, LTE, New Radio, NR, which is also known as fifth generation, 5G, and MulteFire. On the other hand, an example of non-cellular RATs includes IEEE 802.11 based Wireless Local Area Network, WLAN. Principles of the present disclosure are not limited to a specific RAT though. For example, in the context of LTE, AN 20, 30 may be a nodeB or evolved Node B (eNB), while in the context of NR, AN 20, 30 may be a gNB, as in some of the example embodiments below.

The AN 20, 30 may be connected, directly or via at least one intermediate node, to a core network (CN) 24, 34, respectively, such as a Next Generation core network or Evolved Packet Core (EPC). The core network 24, 34 may comprise a set of network functions. A network function may refer to an operational and/or physical entity. The network function may be a specific network node or element, or a specific function or set of functions carried out by one or more entities, such as virtual network elements. Examples of such network functions include a (radio) access or resource control or management function, session management or control function, interworking, data management or storage function, authentication function or a combination of one or more of these functions.

For example, a 5G core network comprises Access and Mobility Management Function (AMF) which may be configured to terminate radio access network (RAN) control plane (N2) interface and perform registration management, connection management, reachability management, mobility management, access authentication, access authorization, Security Anchor Functionality (SEAF), Security Context Management (SCM), and support for interface for non-3GPP access. The AMF is in charge for managing handovers between gNBs. A Unified Data Management (UDM) node performs i.a. subscription management, access authorization based on subscription data, user identification handling and generates authentication credentials.

The core network may be, in turn, coupled with another network (not shown), via which connectivity to further networks may be obtained, for example via a worldwide interconnection network. The AN 20, 30 may be connected with at least one other AN as well via an inter-base station interface, particularly for supporting mobility of the UE 10 or exchanging other information e.g. for carrier allocation, e.g. by 3GPP X2 or similar NG interface.

The UE 10 may be referred to as a user device or a wireless terminal in general. Hence, without limiting to Third Generation Partnership Project (3GPP) User Equipment, the term user equipment or UE is to be understood broadly to cover various mobile/wireless (terminal) communications devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

AN 20 and CN 24 may belong to a first network, which may be referred to as network1 or PLMN1, and AN 30 and CN 34 may belong to a second network, network2/PLMN2. The different PLMNs may require separate subscriptions, a first subscription for communications with and via the PLMN1 and a second subscription for communications with and via the PLMN2. The UE 10 may be a multi-SIM device comprising a first SIM (SIM1) 12 and a second SIM (SIM2) 14 configured for accessing the PLMN1 and PLMN2, respectively. The SIMS may be or comprise a universal subscriber identity module (USIM) for 3GPP based systems, for example. A SIM in various embodiments may be embodied in a Universal Integrated Circuit Card (UICC) that is configured with SIM and/or USIM applications, enabling access to 3GPP based networks. For a CDMA network, a SIM may be a UICC removable user identity module (R-UIM) or a CDMA subscriber identity module (CSIM) on an IC card.

The UE 10 may be configured to use common radio and baseband components that are shared among the multiple SIMS. The UE having multiple transmit and/or receive processing components may use these components simultaneously across SIMS. For example, in some scenarios, the UE with dual Rx chain may be configured with active reception over two SIMs simultaneously by using one Rx chain for one SIM and another Rx chain for another SIM. In another scenario, all available Rx chains may be occupied by one SIM (for example if the UE is configured with dual connectivity and/or carrier aggregation). If the UE does not have available resources (Rx and/or Tx) for simultaneous reception and/or transmission over multiple SIMs, it may still need to perform some tasks for another SIM at the same time with actively receiving and/or transmitting over one SIM. For example, while actively communicating with the first system associated with SIM 12, the UE needs to occasionally check the other system associated with SIM 14, e.g. to monitor the paging channel, perform signal measurements, or read the system information, and determine if it needs to respond to a paging request from the other system.

The UE 10 may be configured to support more than one communications channel and transmit (Tx) and/or receive (Rx) chains using available Tx and/or Rx resources through carrier aggregation and/or dual-connectivity. For example, the UE 10 may have an RF resource that supports a primary component carrier (PCC) and one or more secondary component carriers (SCC). For example, the PCC may include an uplink carrier channel and a downlink carrier channel on a primary cell, and each SCC may be a downlink carrier channel on a secondary cell. During a tune-away in such configured UE, the UE may select one of the SCC downlink or uplink component carriers of the first subscription to tune-away to the second subscription. The selected SCC may not be used to receive data from the PLMN1 during the tune-away.

In some systems, such as NR systems, dual connectivity may be supported, allowing e.g. to provide simultaneous LTE and 5G access. The UE 10 may comprise multiple RF resources or chains available for use simultaneously, as in a carrier aggregation or dual connectivity capable device.

Even if the UE has dual Tx and/or Rx chains, there are still some issues for operating in different cells simultaneously. In below example embodiments we refer to RF chains, although embodiments are not limited to RF (portion) only, but may refer to any other components of Rx and/or Tx chains (stacks). For example, the UE 10 may be configured to use one RF chain (RFC) to receive data in PLMN1 cell 22 and use another RF chain to receive paging in PLMN2 cell 32. Thus, the UE 10 may simultaneously check paging for SIM2 14 subscription network, e.g. via the AN 30, while connected via SIM1 12 subscription network, e.g. via the AN 20. If the PLMN1 configures the UE with dual connectivity from single connection, it means that two RF chains are occupied by PLMN1 cell, there is no RF chain for PLMN2 cell for paging reception.

If the SIM1 12 connected network PLMN1 has enabled dual connectivity (DC) or carrier aggregation (CA), RF chain corresponding to one of the carriers in CA or DC would thus need be switched or re-allocated for SIM2 14 network PLMN2 to check for incoming paging during the paging intervals. Under current specifications, support for multi-USIM is handled in an implementation specific manner. Having the UE to decide which a carrier's RF chain is re-allocated in an implementation specific manner is not very efficient for overall network performance and UEs of different suppliers may operate very differently. There are now provided further improvements facilitating to improve network performance when operating with a multi-subscription and multi-SIM UE.

Figure 2:
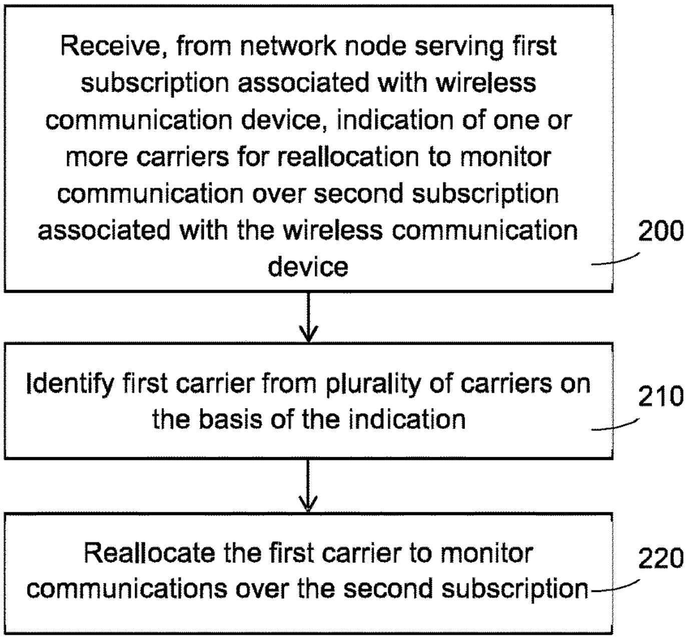
FIG. 2 illustrates a first method in accordance with at least some embodiments.

FIG. 2 is a flow graph of a first method in accordance with at least some embodiments. The illustrated first method may be performed by a wireless communications device, a user equipment, e.g. the UE 10, or by a control device configured to control the functioning thereof, possibly when installed therein. It is to be noted that an action, such as transmitting, in a given block may refer to controlling or causing such action in another apparatus or unit.

The method comprises receiving 200, from a network node serving a first subscription associated with the wireless communication device, an indication of one or more carriers for reallocation to monitor communications over a second subscription associated with the wireless communication device. A first carrier is identified 210 from a plurality of carriers on the basis of the indication. The first carrier is reallocated 220 to monitor communications over the second subscription.

Figure 3:
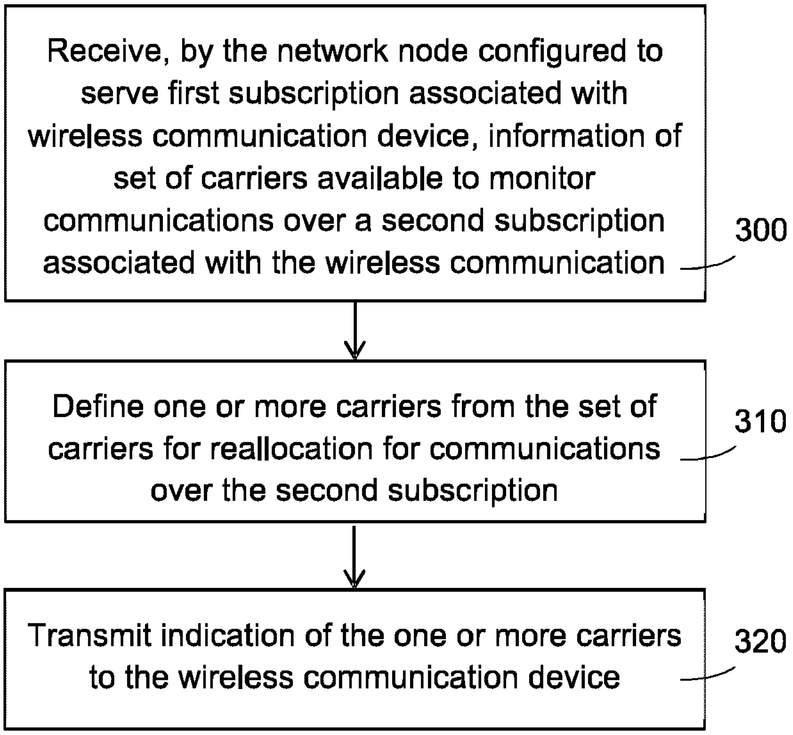
FIG. 3 illustrates a second method in accordance with at least some embodiments.

FIG. 3 is a flow graph of a second method, which may be performed by a network node, such as the AN 20 or 30, or by a control device configured to control the functioning thereof, possibly when installed therein. The wireless network node may be configured to communicate with UE performing the method of FIG. 2.

The method comprises receiving 300, by the network node configured to serve a first subscription associated with a wireless communication device, information of a set of carriers available for communications over a second subscription associated with the wireless communication device. Such information indicative of at least one carrier may be received from an internal or external database, from the wireless device, from another network node, and/or another source. For example, the network node may receive assistance information, indicating preferred carrier(s) and currently camped frequency of the SIM2, from the wireless communication device, some further example embodiments being further illustrated below.

One or more carriers from the set of carriers are defined 310 for reallocation to monitor communications over the second subscription. An indication of the one or more carriers is transmitted 320 to the wireless communication device, which may perform the method of FIG. 2.

The one or more carriers for reallocation may refer to carrier(s) available and/or admitted by the network node for the reallocation. The wireless communications device, in the below example embodiments the UE 10, may be configured to select the first carrier from among a set of carriers, identified in block 210 explicitly or implicitly by the indication. The network node may indicate only one carrier, which the UE has to reallocate when needed. The indication may be an instruction or a recommendation. Although the network node may not exclusively control the RF used for the second subscription, it may still affect or control reallocation by indicating one or more carriers least problematic, e.g. in view of current radio access resource and interference perspective. The monitoring of the communications over the second subscription may comprise monitoring paging from a (second) network and a (second) network node associated with the second subscription, but is not limited thereto, and may refer to reception of other type of information.

The wireless communication device may be configured to perform carrier aggregation and/or dual connectivity by at least the first subscription (via an associated SIM, e.g. the SIM2 12). Thus, at least some of the carriers (and the first carrier) may be carriers for CA or DC, and may be referred to as CA or DC carriers.

The wireless communication device, by a processor thereof, may thus, based on the received indication received in block 200, identify 210 the first carrier and schedule a tune-away from a first subscription, associated with or using a plurality of downlink and uplink component carriers, to a second subscription. For example, the first subscription may be capable of CA, and thus have a PCC and two or more SCCs and one of the SCCs is identified 210 and scheduled for tune-away. The wireless communication device may then tune-away and start to use the first carrier for communication over a SIM of the second subscription, such as the USIM B.

The present features facilitate network performance improvements, in particular for enabling monitoring of communications by a second SIM of a UE while the UE has an active connection by a first SIM. Furthermore, more uniform operation and carrier reallocation behaviour between multi-SIM devices of different vendors is enabled. Since the (first) network node (of a first network) serving the first subscription is now aware of the one or more carriers which the wireless communication device may use for the second subscription (and a second network and a second network node), retransmissions or link failures due to the UE using the carrier for another subscription may be avoided or at least reduced.

The UE may, after the first carrier reallocation, continue communicating, receiving and/or transmitting, with the network node on one or more other carriers, for communications over the first subscription with the network node and allocated for the UE by the network node before the reallocation of the first carrier. Thus, the UE may be configured to continue to receive on a second carrier from the network node (and associated with the first subscription) simultaneously with monitoring the second subscription by the reallocated first carrier.

In some embodiments, the UE 10 is configured to define and transmit assistance information to the network node for defining the one or more carriers for reallocation for monitoring communications over the second subscription. This may be an additional block preceding block 200.

The information of the set of carriers, received by the network node in block 300, may comprise, or be defined based on, the assistance information received from the UE. The UE may be configured to transmit the assistance information upon request by the network node and/or by its own initiation. The network node may include a specific information element indicative of (a request for) assistance information for carrier reallocation definition in an assistance information request, in response to which the UE includes the assistance information for carrier reallocation for the second subscription in an assistance information response. For example, the UE may be configured to transmit the assistance information in response to radio resource control (RRC) establishment or reconfiguration, or after activation of the second subscription.

The assistance information may indicate preference(s) of the UE regarding carriers available to be reallocated or to be tuned away. For example, the assistance information may comprise a list of carriers available for or preferred by the UE for carrier reallocation. The list may be in a sorted order, based on UE's preference of about the carriers.

The assistance information may comprise UE capability information, or such capability information is provided by the UE separately from the assistance information. The capability information may be applied by the network node, similarly as the assistance information, for the carrier definition 310. The capability information, such as frequencies supported by the UE for the second subscription, may be provided by a UE capability information message.

The assistance information (which may herewith refer also to the capability information) may comprise an indication of at least one frequency associated with the second subscription. The assistance information may comprise one or more of:

- one or more frequencies supported by the UE for the second subscription (and associated SIM);
- one or more frequency camped by the UE for the second subscription; and
- one or more preferred frequencies for camping for the second subscription.

For example, the network node may apply the information about the current camped frequency for the second subscription (and SIM) and select a carrier which causes minimum device interference. In another example, the network node may in block 320 decide to use the most preferred carrier by the UE from the provided assistance information, or pick a carrier randomly from the UE provided list.

The assistance information may comprise timing information on or affecting the reallocation of the first carrier. The UE may define such timing information based on scheduling information it has available for upcoming communications over the second subscription. For example, the assistance information may indicate duration of the tune-away (for communications via the second subscription), frequency of the tune-away (e.g. how many times the tune-away may occur per minute), and/or other timing information for the tune-away. This enables the network node to be aware of time instants the first carrier is occupied for transmission in another network (without requiring further signalling to indicate the end of the occupancy), and control carrier allocation accordingly. In an example, a secondary carrier has higher bandwidth than a primary carrier, If the frequency or duration is more than a threshold value, the network node may instruct tune-away to a lower bandwidth primary carrier. If it is less than a threshold value, higher bandwidth secondary carrier may be tuned away.

The reallocation of the first carrier over the second subscription may comprise reallocation for paging monitoring during paging cycle of the second subscription. The UE may be configured to identify timing for the reallocation 220 of the first carrier according to paging cycle of the second subscription. Thus, the UE may perform the tune away to the second subscription at the identified timing.

Thus, the UE may perform a tune-away for the first carrier at paging monitoring periods scheduled for the second subscription, to monitor a paging channel associated with the second subscription (and second network connected via the second subscription). For example, the UE may thus be configured to tune-away the first carrier to receive paging messages while the RRC state for the second subscription is idle or inactive. Once the paging is checked, the UE may automatically change the first carrier for the first subscription, without requiring any network trigger or action.

However, it is to be appreciated that the reallocation may be performed for other communication purposes. For example, the UE may be configured to reallocate the first carrier (among carriers initially applied for USIM A communications) to receive Multimedia Broadcast/Multicast Service (MBMS) data, Short Message Service (SMS) data, or data of another service or application by the USIM A while continuing to receive data by USIM A by another carrier.

The network node may be configured to perform further control actions on the basis of the carrier(s) defined in block 310, such as one or more of the example actions illustrated below. The network node may adapt data and/or control signalling transmission on the basis of block 310.

The network node may prevent scheduling data to the defined one or more carriers after transmitting 320 the indication to the UE. The network node may compensate this by scheduling more data in the other carrier applied for the first subscription.

As already indicated, the reallocation may be time-restricted, such as set for a given time period and/or periodic. For example, the network node may identify timing for the carrier reallocation for the second subscription in connection with of after the block 310 or 320, on the basis of assistance information from the UE. The network node may limit data transmission during the time period(s) in which the carrier is occupied for reallocation for the second subscription.

After the first carrier is no longer occupied for reallocation for the second subscription, the network node may start to use it for the first subscription, and schedule data for the first carrier. The UE may inform the network node when the first carrier is again available.

The network node, by a processor thereof, may perform a carrier selection or reallocation module or function, configured to perform at least block 310. In addition to or instead of the assistance information from the UE, the network node may be configured to apply various other inputs to block 310 to affect the carrier identification/selection in block 310, such as one or more of:

1) information indicative of radio conditions for the UE; e.g. based on received measurement information,
2) information indicative of resource allocations for the UE,
3) carrier-specific load status for carriers in the set of carriers, 4) carrier-specific available bandwidth for carriers in the set of carriers,
5) quality-of-service requirements for at least one bearer allocated for the UE,
6) information on carriers earlier defined for reallocation for one or more other wireless communication devices, and
7) whether a carrier in the set of carriers is a primary or secondary carrier.

As an example of 1), if the UE 10 is facing interference in a particular carrier, that carrier may be reallocated by the AN 20. As an example of 2), if there is a carrier allocated to subscribers based on fair usage policies and the UE 10 is nearly exhausting its resource allocation in that carrier, the carrier may be allocated.

In an example for 3), the UE 10 may be requested to perform tune-away in a lightly loaded carrier. As an example of 4), the network node may in block 320 select a carrier providing low bandwidth (or lower than other candidates), e.g. select a 4G carrier for the tune away, instead of a 5G carrier. In an example for 5), if the UE has a voice bearer, a given carrier may be preferred. Likewise, if it has only data bearers, some other carrier(s) may be preferred. Thus, the type of communication may be used as an input for the carrier selection in block 310.

In a simple example for 6), a first portion of (MUSIM) UEs, e.g. half of them, may be directed by blocks 320 and 330 to do tune-away in one frequency and another portion in another frequency.

Figure 4A:
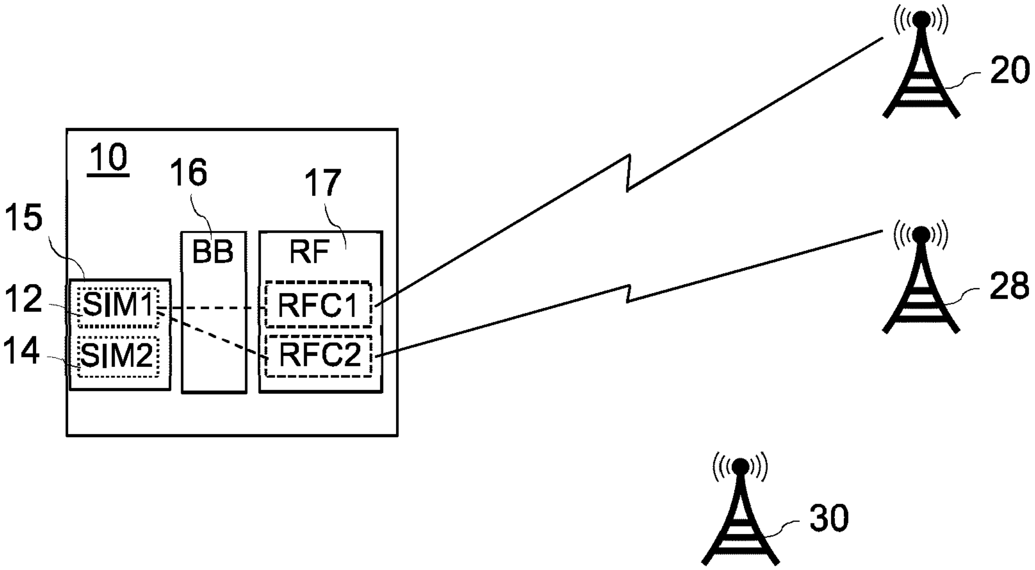
FIGS. 4*a* and 4*b* illustrate carrier allocation examples.
Figure 4B:
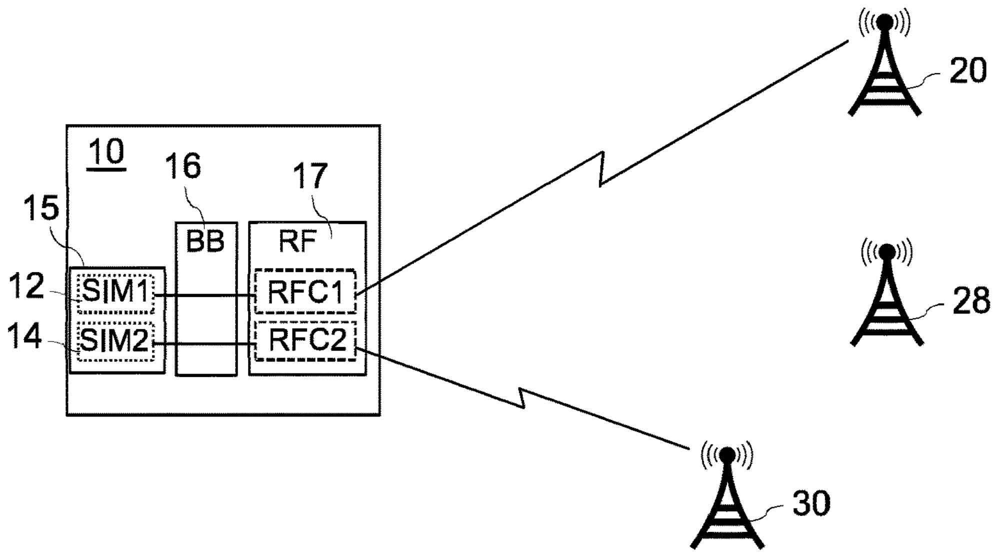

FIGS. 4*a* and 4*b* illustrate radio access and carrier allocation examples for a multi-SIM UE 10 operating in an area of network nodes 20, 28, and 30. The network nodes 20, 28 may be associated with operator1/PLMN1, and may be of different RATs. For example, node 20 may be a 5G NR gNB and node 28 may be an LTE eNB. The network node 30 may be associated with another operator 2/PLMN2, and may be e.g. gNB or eNB.

The multi-SIM UE 10 may include a SIM interface 15. The SIM interface may be adapted to receive the (first SIM) SIM1 12, that is associated with the first subscription, and the (second SIM) SIM2 14 that is associated with the second subscription.

Radio connectivity may be provided for wireless communications associated with each SIM 12, 14 of the UE by baseband (BB) resource 16 and RF resource 17 connected to an antenna unit. The BB resource 16 may comprise or performed by a baseband modem processor, in some embodiments physically or logically separate baseband modem processors. A baseband-modem processor of the UE 10 may be configured to perform at least one protocol stack associated with at least one SIM, to support a variety of communication services.

The RF resource 17 may be adapted to perform transmit/receive functions for wireless services associated with each SIM of the UE 10. RF chains (e.g. RFC1 and RFC2) may be provided for sending and/or receiving RF signals for multiple SIMS, thereby enabling the UE to perform simultaneous communications with separate networks and/or service associated with the SIM(s). It is to be noted that although RFC1 and RFC2 are illustrated at the RF resource, they may extend to the BB resource 16 and cover protocol layers provided by respective BB resource.

For example, the UE may be a single Tx/dual Rx or a dual Tx/dual Rx capable device. The RF resource 17 may include separate receive and transmit functionalities, or may include a transceiver that combines transmitter and receiver functions. The RF resource may be configured with receiver and transmitter circuitry to support multiple radio access technologies/wireless networks that operate according to different wireless communication protocols. Such circuitry may allow the RF resource to process signals associated with different communication standards, and may include or provide connections to different sets of amplifiers, digital to analog converters, analog to digital converters, filters, voltage controlled oscillators (VCOs), etc.

The BB resource 16, the RF resource 17 (which may comprise transceivers connected to RF front end) may apply a plurality of uplink and downlink component carriers for subscriptions associated with the SIMS 12, 14. At least some embodiments illustrated above may be applied for identifying or selecting a component carrier for a SIM 12, 14.

As illustrated in the example of FIG. 4*a*, the UE 10 may have the SIM1 camped to network1 (comprising the nodes 20 and 28) and the SIM2 14 may be camped and in idle mode for the node 30 of network1 (comprising the node 30). For example, the user of the UE 10 may be playing multi-player online video game. To support heavy bandwidth requirements, network1 has configured dual connectivity, by RFC1 with the node 20 and RFC2 with the node 28. For example, 5G gNB and LTE eNB are applied for SIM1 12 for dual reception, i.e. data packets for the game application are received using both LTE and 5G network.

RRC (entity) associated with the SIM2 14 in the idle mode needs to monitor paging during its paging occasion based on discontinuous reception (DRX) configuration of network node 30. For this, the SIM2 RRC needs an RFC, both RFC1 and RFC2 are used for the SIM1 12 for receiving data from nodes 20 and 28 for the game application. If the UE would on its own decide to tune-away one RFC during the paging occasions, e.g. RFC for 5G NR (since in NSA LTE is the master and radio link failure monitoring are performed on the master leg), the network 1 may unknowingly continue to send data on both legs via the node 20 and 28. Since the data via the 5G node cannot be received, this would result in retransmissions and in worst case to link failure.

By applying at least some of the features illustrated in connection with the above illustrated methods, the network 1 may decide the carrier to be used for tune-away for paging monitoring (for the other subscription and SIM 14). The UE may provide assistance information, such as the list of carriers that could be used for RF reallocation, its preference about which one to be tuned away among those carriers, and the currently camped frequency for the SIM2. Network1 may consider a set of factors and parameters, both system wide as well as UE specific, and decides a carrier that could be reallocated for listening to paging for SIM1.

For example, the network 1 (e.g. node 20) may request or instruct the UE to reallocate carrier and RFC2 initially used for LTE reception from eNB node 28 for listening to paging for SIM2 14 paging occasion, as illustrated in FIG. 4*b*. Further, network1 may schedule more data through NR carrier and RFC1 during this time so that user experience is not diminished too much. Thus, upon the indication from the network1, RFC2 of the indicated carrier is reallocated to monitor paging for SIM2 14, from the node 30 of the network2. After the paging cycle, the UE 10 may reinstate the carrier and the RFC2 for SIM1 to communication with node 28 and network1, and return to state as in FIG. 5*a*. At a subsequent paging occasion, the UE 10 may again reallocate the RFC2 for SIM2, and the operations may be repeated e.g. until another indication is received from network 1, dual connectivity is terminated, or the RRC state for SIM1 or SIM2 otherwise changes.

It is to be noted that at least some of the presently illustrated features may be applied for various other CA and/DC connectivity cases. For example, aggregated carriers may be 3GPP NR carriers and/or LTE carriers. Dual connectivity could be LTE-LTE dual connectivity or NR-NR dual connectivity, or even NR-LTE dual connectivity in 5G SA mode with NR as the master. Carrier aggregation or dual connectivity could be enabled for any number of user scenarios which require higher bandwidth, such as downloading an application in a smartphone, a large file transfer, or viewing a movie.

The indication in block 200 and 320 may be an implicit or an explicit indication. For example, the network node may transmit a control message comprising identifier(s) of the carrier(s). In another example option, the UE is configured to detect the indicated carriers in block 200 based on indirect indication of the carriers. For example, the UE 10 informs the AN 20 serving the SIM1 12 about the time when it will use the RF or the first carrier for SIM2 14 operations. The AN 20 may further acknowledge this within the configuration of the first carrier. Such an acknowledgement may be considered as an implicit indication. RRC associated with the SIM 12 may configure RRC parameters on the basis of such timing information received from the UE. For example, —there may be multiple paging occasions for the SIM2 14, out of which the SIM1 associated RRC may select one or more for the first carrier and/or define DRX parameter(s) for the first carrier. If such configuration(s) are included only in a particular carrier's configuration, it means there is an implicit indication to use that carrier.

The indication carrier(s) in block 200, 320 and/or the assistance information may be included in an existing control message, as new information element, field, or parameter information. Alternatively, a new control message may be applied.

Some examples of messages and information elements are illustrated below, with references to FIG. 5, which is an example signalling chart for 3GPP based system, in which the network node is an eNB or gNB.

The assistance information from the UE 10 for defining the carriers for reallocation may be included in a UE assistance information message 500, which may be a 3GPP UEAssistanceInformation message, or another message by which the UE may provide assistance information for the network node, such as another uplink RRC message. For example, the assistance information, such as currently camped frequency (for the second subscription), may be indicated to the network node in an RRC connection setup complete message. Other examples for the assistance information include re-establishment complete message and reconfiguration complete message.

The UE may be configured to send a separate RRC indication message to update assistance information for the network node, which may be particularly useful when the serving frequency of the second subscription and USIM changes.

The message 500 may be included with a new information element, which may be referred to as MUSIM assistance information element, or carrierReallocationForOtherUSIMAssistance, for example. In a further example, the UE configured to provide MUSIM assistance information may check if MUSIM assistance information requested by the eNB/gNB indicates carrierReallocationToOtherUSIMAssistance. If so, the UE initiates transmission of the UE assistance information message 500, which may comprise currently camped frequency of the other USIM and a list of carriers that could be reallocated for monitoring paging in the other USIM, for example.

The indication of block 200, 320 may be included in an RRC reconfiguration message. The network node may transmit such RRC reconfiguration message to the UE 10 in RRC connected state towards the network node.

Figure 5:
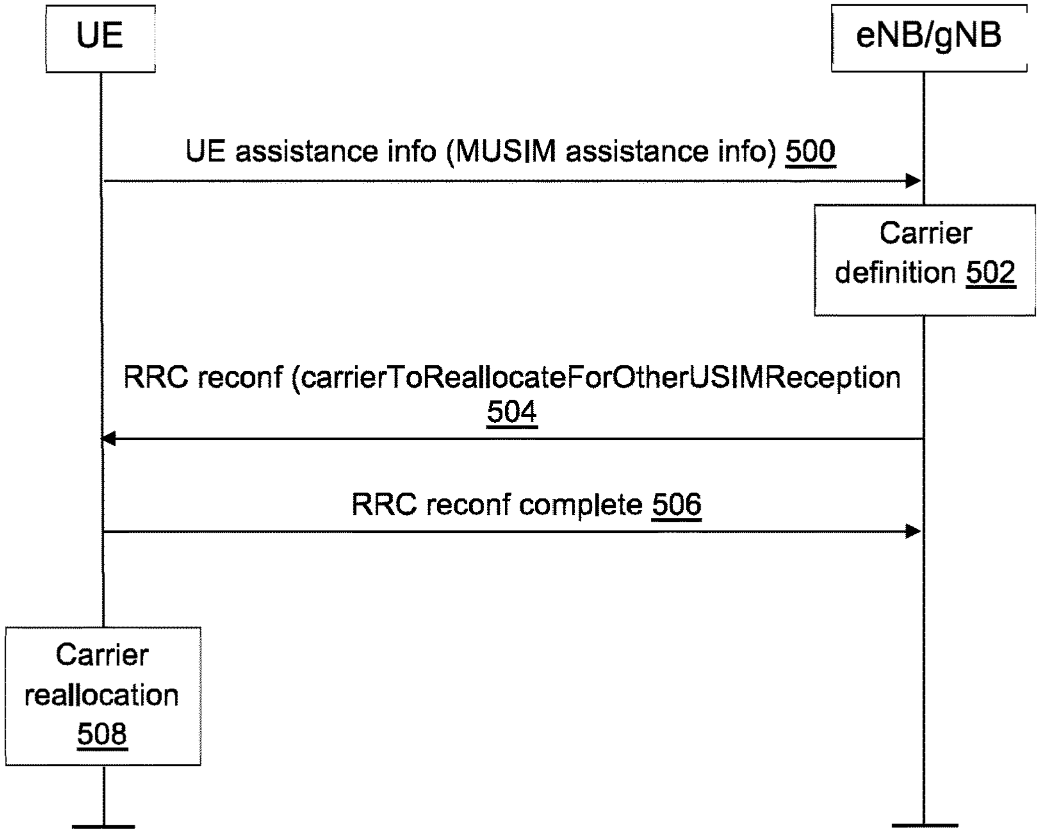
FIG. 5 is a signalling diagram in accordance with at least some embodiments.

As illustrated in the example of FIG. 5, the eNB/gNB may, after defining 502 the carrier(s) for the reallocation for another subscription/USIM, generate an RRC reconfiguration message 504. The message 504 comprises an information element for the indication, which may be referred to as carrierToReallocateForOtherUSIMReception, for example. The UE responds with RRC reconfiguration complete message 506.

The UE configures carrier reallocation 508 in accordance with the received RRC reconfiguration message 504 and the indication. The UE may then reallocate a carrier indicated in the message 504 to monitor paging for the USIM B, for example.

For example, the UE 10 is configured to check if a received RRCReconfiguration message 504 includes the carrierToReallocateForOtherUSIM. If so, the UE uses the carrier specified in a (sub-)element carrierToReallocateForOtherUSIMReception for tune-away during paging monitoring for another USIM.

The indication of the carrier(s) in block 200, 320 may thus be provided as a part of CA and/or DC connectivity configuration message, such as the RRC connection reconfiguration message in LTE and RRC reconfiguration message in NR. The indication may be transmitted with CA or DC configuration.

It may be possible that the UE 10 is not able to reallocate the RF corresponding to the carrier instructed by gNB. In one option, this does not lead to failure of reconfiguration message with CA/DC configuration, and UE may inform that it cannot comply with this instruction, e.g. by a UE information indication message.

Although examples were provided above with references to 3GPP based example system, it is to be appreciated that at least some of the present features may be applied in connection with various different non-3GPP systems.

An electronic device comprising electronic circuitries may be an apparatus for realizing at least some embodiments. The apparatus may be or may be comprised in a computer, a laptop, a tablet computer, a cellular phone, a machine to machine (M2M) device (e.g. an IoT sensor device), a wearable device, a base station, access point device, a nodeB, a radio access control device, a network function element or node, or another apparatus provided with radio access control capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 6:
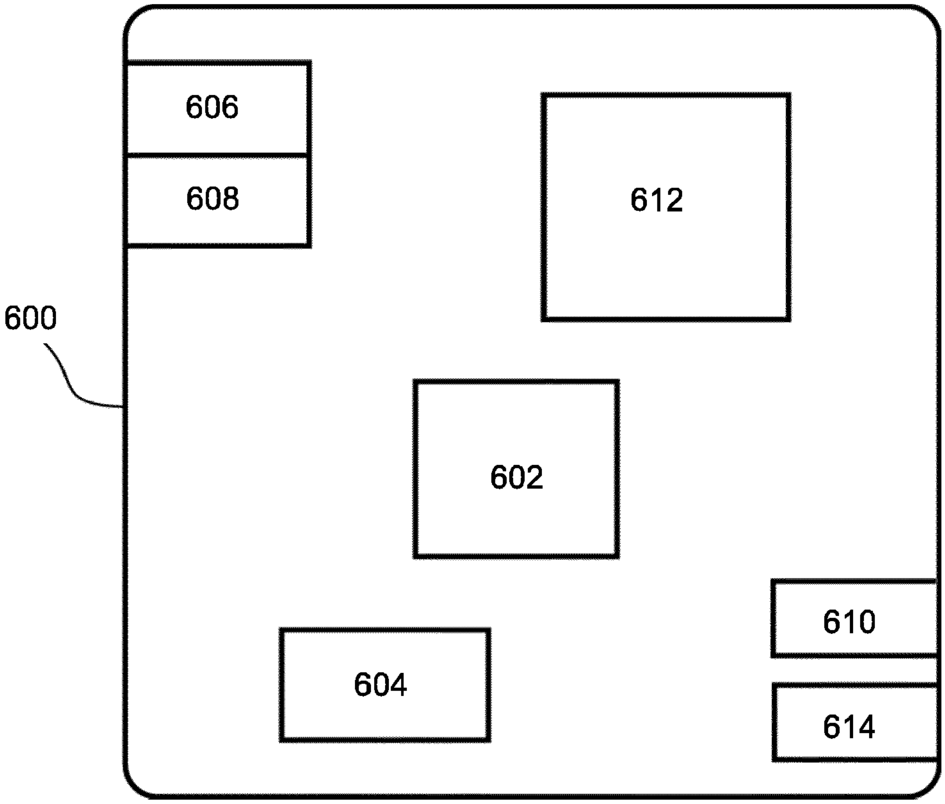
FIG. 6 illustrates an example apparatus capable of supporting at least some embodiments.

FIG. 6 illustrates an example apparatus capable of supporting at least some embodiments of the present invention. Illustrated is a device 600, which may comprise a communications device arranged to operate as the AN 20, or the UE 10, for example. The device may include one or more controllers configured to carry out operations in accordance with at least some of the embodiments illustrated above, such as some or all of the features illustrated above in connection with FIGS. 1 to 5. The device may be configured to operate as the apparatus configured to perform the method of FIG. 2 or 3, for example.

Comprised in the device 600 is a processor 602, which may comprise, for example, a single- or multi-core processor wherein a single-core processor comprises one processing core and a multi-core processor comprises more than one processing core. The processor 602 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 600 may comprise memory 604. The memory may comprise random-access memory and/or permanent memory. The memory may comprise at least one RAM chip. The memory may comprise solid-state, magnetic, optical and/or holographic memory, for example. The memory may be at least in part accessible to the processor 602. The memory may be at least in part comprised in the processor 602. The memory 604 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 600 but accessible to the device.

For example, computer program code and control parameters for affecting the carrier reallocation and affecting controlling operations illustrated in connection with FIGS. 2 and/or 3 may be stored in one or more portions of the memory and used to control operation of the apparatus. Further, the memory may be used as a temporary data storage, such as for storing parameters affecting operations of the above-illustrated methods, e.g. for defining the carrier and/or reallocating the carrier.

The device 600 may comprise a transmitter 606. The device may comprise a receiver 608. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 600 may comprise a near-field communication, NFC, transceiver 610. The NFC transceiver may support at least one NFC technology, such as NFC, Bluetooth, Wibree or similar technologies.

The device 600 may comprise user interface, UI, 612. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 604 or on a cloud accessible via the transmitter 606 and the receiver 608, or via the NFC transceiver 610, and/or to configure the operation and parameters of the device.

The device 600 may comprise or be arranged to accept user identity modules 614. For example, the device may comprise the SIM interface 15 for connecting the two SIMS 12, 14. The user identity module 614 may comprise information identifying a subscription of a user of device 600. The user identity module 614 may comprise cryptographic information usable to verify the identity of a user of device 600 and/or to facilitate encryption and decryption of communication effected via the device 600.

The processor 602 may be furnished with a transmitter arranged to output information from the processor, via electrical leads internal to the device 600, to other devices comprised in the device. Such a transmitter may comprise a serial bus transmitter arranged to, for example, output information via at least one electrical lead to memory 604 for storage therein. Alternatively to a serial bus, the transmitter may comprise a parallel bus transmitter. Likewise the processor may comprise a receiver arranged to receive information in the processor, via electrical leads internal to the device 600, from other devices comprised in the device 600. Such a receiver may comprise a serial bus receiver arranged to, for example, receive information via at least one electrical lead from the receiver 608 for processing in the processor. Alternatively to a serial bus, the receiver may comprise a parallel bus receiver.

The device 600 may comprise further devices not illustrated in FIG. 6. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 610 and/or the user identity module 614.

The processor 602, the memory 604, the transmitter 606, the receiver 608, the NFC transceiver 610, the UI 612 and/or the user identity module 614 may be interconnected by electrical leads internal to the device 600 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof.

Furthermore, the described features, structures, or characteristics may be combined in any suitable manner in one or more embodiments. In the preceding description, numerous specific details are provided to provide a thorough understanding of some embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

What is claimed is:

1. An apparatus, comprising:
at least one processor; and
at least one memory storing instructions that, when executed by the at least one processor, cause the apparatus at least to:
receive, from a network node serving a first subscription associated with the apparatus, an indication of one or more carriers for reallocation to monitor communication over a second subscription associated with the apparatus;
identify a first carrier from a plurality of carriers on the basis of the indication;
reallocate the first carrier to monitor communications over the second subscription; and
after the reallocation, continue receiving on a second carrier simultaneously with monitoring the communications over the second subscription by the reallocated first carrier, wherein the second carrier is used for communications over the first subscription.

2. The apparatus of claim 1, wherein, prior to reallocating the first carrier to monitor communications over the second subscription, the first carrier did not monitor communications over the second subscription.

3. The apparatus of claim 2, wherein, prior to reallocating the first carrier to monitor communications over the second subscription, the first carrier monitored communications over the first subscription.

4. The apparatus of claim 1, wherein the reallocating comprises reallocating for paging monitoring during a paging cycle of the second subscription.

5. The apparatus of claim 4, wherein the at least one memory and the instructions are further configured to cause the apparatus to identify timing for the reallocation of the first carrier according to a paging cycle of the second subscription.

6. The apparatus of claim 1, wherein the at least one memory and the instructions are further configured to cause the apparatus to transmit assistance information to the network node for defining the one or more carriers for reallocation for monitoring communications over the second subscription.

7. The apparatus of claim 6, wherein the assistance information comprises an indication of at least one frequency associated with the second subscription.

8. The apparatus of claim 7, wherein the indication of at least one frequency associated with the second subscription comprises at least one of: one or more frequencies supported by the wireless communications device for the second subscription; one or more frequency camped by the wireless communications device for the second subscription; or a preferred frequency for camping for the second subscription.

9. The apparatus of claim 7, wherein the assistance information comprises timing information associated with the communications over the second subscription.

10. The apparatus of claim 1, wherein reallocating the first carrier to monitor communications over the second subscription comprises reallocating the first carrier from the first subscription to monitor communications over the second subscription.

11. The apparatus of claim 1, wherein a frequency supported by the first subscription is a first frequency, and wherein reallocating the first carrier to monitor communications over the second subscription comprises reallocating the first frequency to the second subscription.

12. The apparatus of claim 1, wherein one of the second carrier or a third carrier monitored the communications over the second subscription prior to reallocating the first carrier to monitor communications over the second subscription.

13. The apparatus of claim 1, wherein the apparatus comprises a user equipment with a first subscriber identity module associated with the first subscription and a second subscriber identity module associated with the second subscription.

14. An apparatus, comprising:
at least one processor; and
at least one memory storing instructions that, when executed by the at least one processor, cause the apparatus at least to:

receive, by the apparatus configured to serve a first subscription associated with a wireless communication device, information of a set of carriers available for communications over a second subscription associated with the wireless communication device;

define one or more carriers from the set of carriers for reallocation from serving the first subscription to serve the second subscription; and transmit an indication of the one or more carriers to the wireless communication device.

15. The apparatus of claim 14, wherein the at least one memory and the instructions are further configured to cause the apparatus to prevent scheduling data to the defined one or more carriers after transmitting the indication to the wireless communications device.

16. The apparatus of claim 14, wherein the at least one memory and the instructions are configured to define the one or more carriers for reallocation over the second subscription on the basis of at least one of: information indicative of radio conditions for the wireless communication device, information indicative of resource allocations for the wireless communication device, carrier-specific load status for carriers in the set of carriers, carrier-specific available bandwidth for carriers in the set of carriers, quality-of-service requirements for at least one bearer allocated for the wireless communication device, information on carriers earlier defined for reallocation for one or more other wireless communication devices, or whether a carrier in the set of carriers is a primary or secondary carrier.

17. The apparatus of claim 14, wherein the information of the set of carrier comprises or is defined based on assistance information received from the wireless communication device.

18. A method for a wireless communication device, comprising:

receiving, from a network node serving a first subscription associated with the wireless communication device, an indication of one or more carriers for reallocation to monitor communications over a second subscription associated with the wireless communication device;

identifying a first carrier from a plurality of carriers on the basis of the indication; and reallocating the first carrier from the first subscription to monitor communications over the second subscription.

19. The method of claim 18, further comprising: continuing receiving on a second carrier after the reallocation, wherein the second carrier is used for communications over the first subscription.

20. The method of claim 19, further comprising: continuing receiving on the second carrier simultaneously with monitoring the communications over the second subscription by the reallocated first carrier.

* * * * *